United States Patent [19]

Furuhata et al.

[11] Patent Number: 4,600,953
[45] Date of Patent: Jul. 15, 1986

[54] HEAD SWITCHING SIGNAL PRODUCING CIRCUIT FOR A MAGNETIC RECORDING AND REPRODUCING APPARATUS

[75] Inventors: Takashi Furuhata, Yokohama; Taihei Nakama; Yoshinori Masuda, both of Katsuta, all of Japan

[73] Assignee: Hitachi, Ltd., Tokyo, Japan

[21] Appl. No.: 579,595

[22] Filed: Feb. 13, 1984

[30] Foreign Application Priority Data

Feb. 14, 1983 [JP] Japan .............................. 58-21445
Feb. 25, 1983 [JP] Japan .............................. 58-29322

[51] Int. Cl.⁴ ............................................. H04N 5/783
[52] U.S. Cl. ..................................... 360/10.3; 360/64
[58] Field of Search .................. 360/10.3, 37.1, 38.1, 360/64; 358/312, 319

[56] References Cited

U.S. PATENT DOCUMENTS 4,420,775 12/1983 Yamazaki et al. ................ 360/38.1
4,428,004 1/1984 Mino .................................. 360/10.3
4,509,082 4/1985 Kröner ............................... 360/37.1

Primary Examiner—Donald McElheny, Jr.
Attorney, Agent, or Firm—Antonelli, Terry & Wands

[57] ABSTRACT

In a helical scanning type video tape recorder provided with two rotary video heads for recording and reproducing a video signal supplied to the heads in the oblique direction of a magnetic tape by alternately switching the two rotary video heads, there is generated a switching signal for the heads which is stable in standard and high speed reproducing modes and thereby stable reproduction always can be obtained. For this purpose, there are provided a circuit for detecting the rotary phase of any one of the two rotary heads, a clock signal generator circuit for generating a clock signal, a counter apparatus for counting the clock signal on the basis of the output of the rotary phase detecting circuit, and a circuit for generating a switching signal for alternately switching the two heads on the basis of the counted value of the counter apparatus.

19 Claims, 8 Drawing Figures

HEAD SWITCHING SIGNAL PRODUCING CIRCUIT FOR A MAGNETIC RECORDING AND REPRODUCING APPARATUS

BACKGROUND OF THE INVENTION

The present invention relates to a magnetic recording and reproducing apparatus, for example, a video tape recorder of the rotary two-head type which records a video signal in the direction of width of a magnetic tape by means of two rotary magnetic heads and which reproduces this recorded signal by the same heads and, more particularly, to an improvement of a circuit for producing a signal by which the above two magnetic heads are alternately switched, thereby enabling the recording/reproducing of the video signal.

Figure 1:
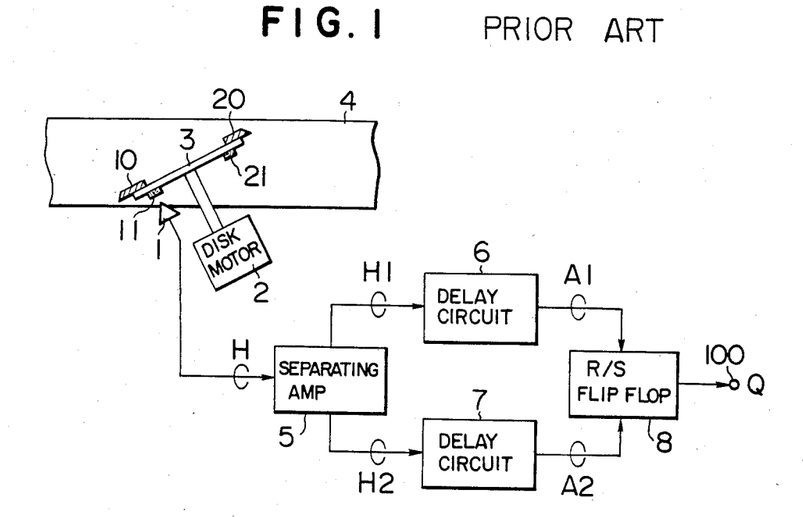
FIG. 1 is a block diagram illustrating a conventional head switching signal producing circuit.
Figure 2:
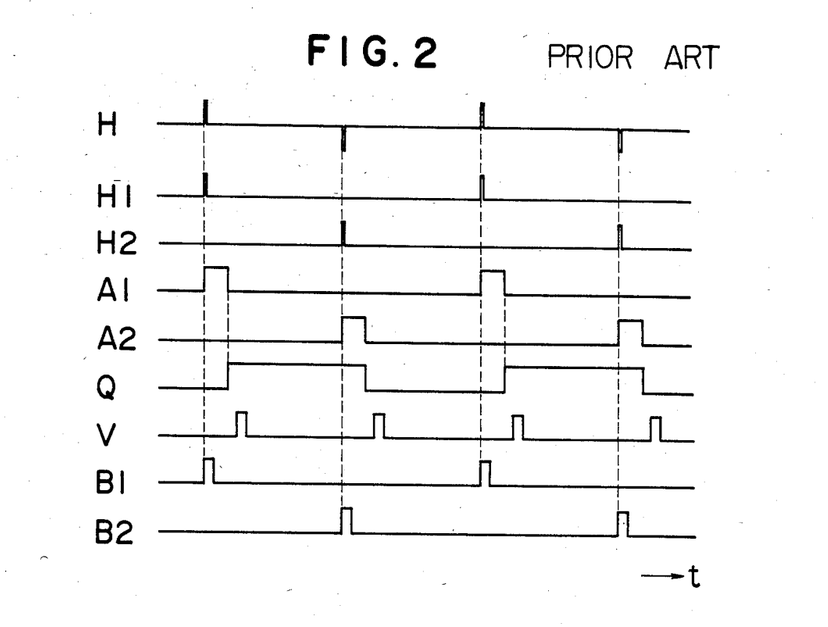
FIG. 2 shows a waveform diagram to explain its operation.

FIG. 1 is a block diagram illustrating a conventional head switching signal producing circuit in a video tape recorder of the rotary 2-head type. FIG. 2 is a diagram showing the output waveforms at the main parts of the circuit of FIG. 1.

Figure 5:
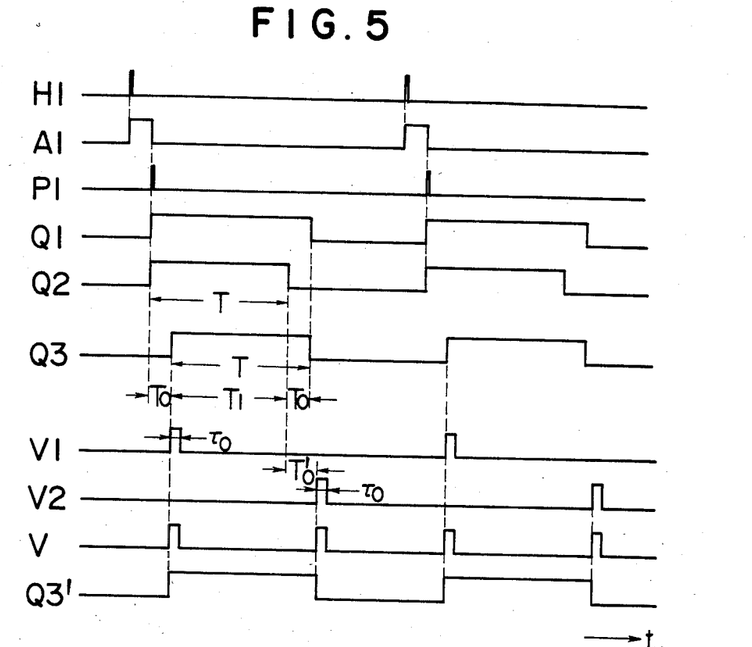
FIG. 5 shows a waveform diagram to explain its operation.

In FIG. 1, reference numerals 10 and 20 denote magnetic heads for alternately recording or reproducing a video signal on or from a magnetic tape 4 for every field. These two magnetic heads 10 and 20 are attached on a disk 3 at an angle of 180° apart from each other and are rotated at a constant speed by a disk motor 2 together with the disk 3. Two magnets 11 and 21 are respectively attached to the disk 3 at an angle of 180° apart from each other with respect to the positions of the magnetic heads 10 and 20 and these are detected by a tack head 1. A signal $H_1$ indicative of the position which was detected with respect to the magnet 11 and a signal $H_2$ representing the position which was detected with respect to the magnet 21 are respectively separated from an output H from the tack head 1 by a separating amplifier 5 and are output. The output signals $H_1$ and $H_2$ from the circuit 5 are respectively supplied to delay circuits (e.g. multivibrators) 6 and 7 and are individually delayed, respectively. A reference numeral 8 indicates an R/S flip flop circuit; its output Q is triggered (set) by an output $A_1$ from the delay circuit 6 and becomes a high level "H", while it is triggered (reset) by an output $A_2$ from the delay circuit 7 and becomes a low level "L". The output Q from this circuit 8 is output as a head switching signal from a terminal 100. The phase of the magnetic head 10 is specified by the phase of the leading edge of this head switching signal Q, while the phase of the magnetic head 20 is specified by the phase of the trailing edge of the signal Q. However, since the positions of the two magnetic heads are detected through the magnets as mentioned above, it is necessary to adjust the phase of the signal Q in accordance with the relative attaching positions of the magnetic heads 10, 20, magnets 11, 21, and tack head 1. Due to this, conventionally, the phases were needed to be individually adjusted by the delay circuits 6 and 7, respectively.

In addition, the above-mentioned head switching signal Q is used as a reference signal of the head disk servo system for correctly recording a video signal in the specified position of the magnetic tape 4 in the recording mode, while it is used to correctly switch the video signal to be alternately reproduced for every field by the magnetic heads 10 and 20 in the reproducing mode. Therefore, if the above phase adjustment is incomplete, the normal recording and reproducing will not be performed, so that this causes problems such that noises appear in the reproduced picture and that the compatible reproduction becomes difficult, and the like. Due to this, it is necessary to respectively individually and finely adjust in such a manner that in the delay circuits 6 and 7, the spatial relative positions of the magnetic heads 10 and 20 and the magnetic tape 4 have the specified relationship and that the duty ratio of the head switching signal Q is accurately 50%. Thus, there is a problem of increase in total cost of a set since it takes a longer time for adjustment in addition to complication of its adjusting procedure. In FIG. 2, V is a false sync signal and $B_1$ and $B_2$ are output signals of the delay circuits 6 and 7.

SUMMARY OF THE INVENTION

It is an object of the present invention to provide a magnetic recording and reproducing apparatus having a simple constitution which can stably perform recording and reproducing.

Another object of the present invention is to provide a magnetic recording and reproducing apparatus which can always stably reproduce in the standard reproducing mode and in the special reproducing mode such as high speed reproduction, still reproduction, etc.

The present invention comprises a circuit for detecting the rotational phases of the magnetic heads; and a counter for counting $N_0$ of predetermined clock signals on the basis of that the detecting circuit, then counting $N_1$ thereof, thereafter further counting $N_0$ thereof; this counter consisting of means for setting the above count values $N_0$ and $N_1$ so that the count time of the above $(N_0+N_1)$ becomes the time which is equal to one half of the rotational period of the above magnetic heads, and means which receives the count output of the above counter, thereby producing a desired head switching signal, whereby a stable head switching signal always is produced.

According to the present invention, the phase control means can be reduced and it is possible to obtain stable operation with a minimum adjustment.

In addition, according to the present invention, it is possible to always produce a head switching signal of a duty ratio of 50% or a precedence signal of a duty ratio of 50% which is time-precedent from that head switching signal, and also it is digitally produced. Therefore, a stable and extremely highly accurate operation always can be obtained without being influenced due to the fluctuation of the power source voltage, change in the ambient temperature and moisture, and the like.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

The present invention will now be described hereinbelow with reference to the drawings.

Figure 3:
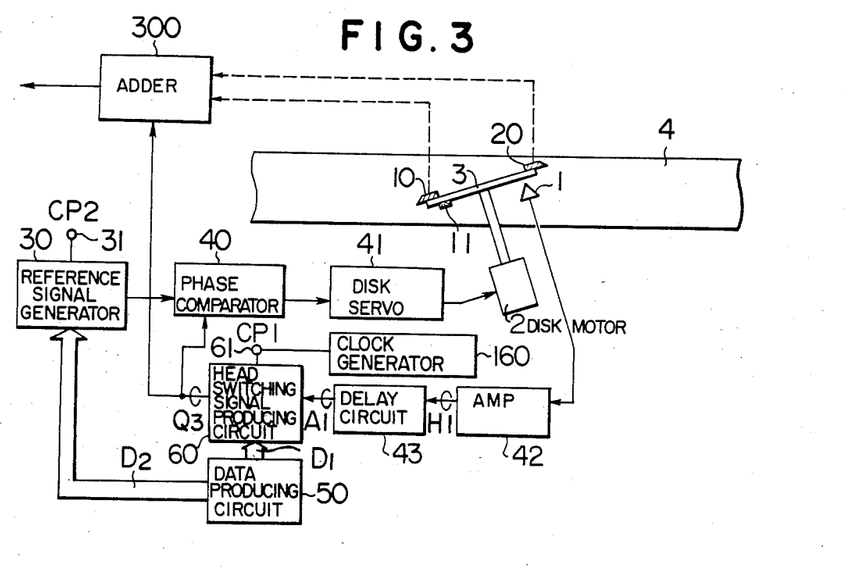
FIG. 3 is a block diagram illustrating one embodiment of the present invention.
Figure 4:
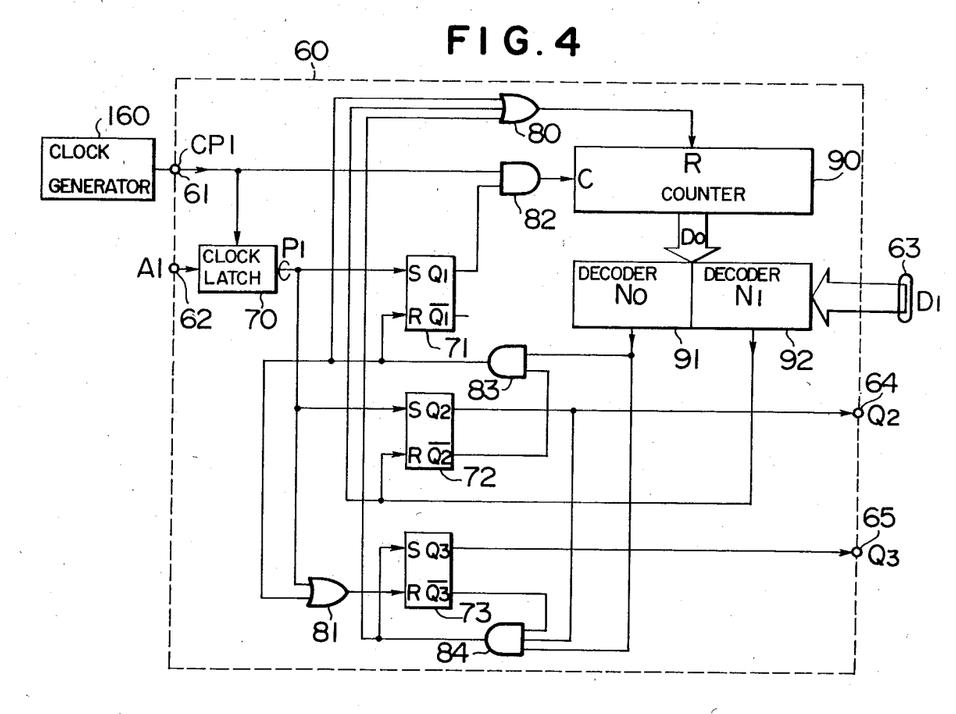
FIG. 4 is a block diagram showing one embodiment of a head switching signal producing circuit according to the present invention.

FIGS. 3 to 5 are diagrams showing one embodiment of the present invention, in which FIG. 3 is a block diagram illustrating one embodiment of a head disk servo system in which reproduction is effected using a head switching signal producing circuit 60 according to the present invention; FIG. 4 is a block diagram showing one embodiment of the head switching signal producing circuit 60; and FIG. 5 is a diagram showing the output waveforms at the main parts thereof.

In FIG. 3, the magnetic heads 10 and 20 are attached to the disk 3 so as to be spaced at an angle of 180° from each other. One magnet 11 is attached to the disk 3 at the position of the magnetic head 10 and its position is detected by the tack head 1. An output from the tack head 1 is supplied to an amplifier 42 and is amplified. The output $H_1$ ($H_1$ in FIG. 5) of the amplifier 42 is supplied to a delay circuit (e.g. multivibrator) 43 and its phase is adjusted by the circuit 43 so that the spatial relative positions of the magnetic head 10 and magnetic tape 4 have a specified relationship. The output $A_1$ ($A_1$ in FIG. 5) of the circuit 43 is supplied to the head switching signal producing circuit 60. In this circuit 60, as will be described later, a head switching signal $Q_3$ ($Q_3$ in FIG. 5) is produced; this signal $Q_3$ becomes "H" during time T that is equal to one half of the rotational period of the magnetic heads 10 and 20 and thereafter becomes "L" after time $T_0$ ($T_0$ in FIG. 5) from the trailing edge of the output $A_1$ from the circuit 43. This signal $Q_3$ is supplied to one input of a phase comparator 40. A reference signal from a reference signal generator 30 is supplied to the other input of the circuit 40. A signal responsive to the phase difference between the head switching signal $Q_3$ and the reference signal is output from the circuit 40. The output from this circuit 40 is supplied to the disk motor 2 through a disk servo circuit 41. The loop constituted by the circuits 42, 43, 60, 40, and 41 including the disk motor 2 constitutes a negative feedback control system and is controlled so that the rotating speed of the disk motor 2 and the frequency of the head switching signal $Q_3$ are equal to the frequency of the reference signal from the circuit 30. A circuit 50 is a data producing circuit which produces n-bit binary data $D_1$ and m-bit binary data $D_2$ and supplies this data to the circuits 60 and 30, respectively. The circuit 30 is constituted by an m-bit counter. The circuit 30 counts clock $CP_2$ from a terminal 31, namely, repeatedly counts only the number equal to a value of the m-bit binary data $D_2$ from the circuit 50, thereby generating the reference signal of a predetermined frequency f. The head switching signal $Q_3$ from the circuit 60 is supplied to a reproduction video signal circuit 300 and is used to switch the video signal which is alternately reproduced for every field by the magnetic heads 10 and 20 to one continuous signal. And, 160 denotes a clock generator.

The operation of the head switching signal producing circuit 60 will now be described on the basis of the embodiment of FIG. 4.

In FIG. 4, a reference numeral 61 denotes an input terminal of clock $CP_1$; 62 is an input terminal of the output $A_1$ from the delay multi circuit 43 of FIG. 3; and 63 is an input terminal of the n-bit data $D_1$ from the data producing circuit 50. A numeral 70 indicates a clock latch circuit; 71, 72 and 73 are R/S flip flops (hereinafter, abbreviated as F.F.); 80 and 81 are OR gates; and 82, 83 and 84 are AND gates. A numeral 90 is an n-bit counter; 91 and 92 are decoders for decoding the count value of the counter 90, in which the decoder 91 outputs an "H" signal when the count value of the counter 90 becomes $N_0$, while the decoder 92 outputs an "H" signal when the count data $D_0$ of the counter 90 and the data $D_1$ from the input terminal 63 are compared and are found to coincide, i.e., when the count value of the counter 90 is equal to the value $N_1$ of the data $D_1$. Here, $N_0$ and $N_1$ are determined so as to be $N_0<N_1$. The signal $A_1$ from the terminal 62 ($A_1$ in FIG. 5) is supplied to the clock latch circuit 70, and this latch circuit produces a pulse $P_1$ ($P_1$ in FIG. 5) synchronized with the clock $CP_1$ from the terminal 61 from the trailing edge of the input signal $A_1$ and outputs this pulse $P_1$.

This output $P_1$ is supplied to the set input terminals S of the F.F.s 71 and 72 and through the gate 81 to a reset input terminal R of the F.F. 73. Due to this, a $Q_1$ output ($Q_1$ in FIG. 5) of the F.F. 71 becomes "H"; a $Q_2$ output ($Q_2$ in FIG. 5) of the F.F. 72 becomes "H" and a $\overline{Q}_2$ output becomes "L"; and a $Q_3$ output ($Q_3$ in FIG. 5) of the F.F. 73 becomes "L" and a $\overline{Q}_3$ output becomes "H". When the $Q_1$ output of the F.F. 71 becomes "H", the gate 82 opens, so that the clock $CP_1$ from the terminal 61 is input through the gate 82 to a clock input terminal of the counter 90, and this allows the counter 90 to start counting from the count value of zero. When the count value of the counter 90 becomes $N_0$, the output of the decoder 91 becomes "H" and since the $Q_2$ output of the F.F. 72 is "H" and the $\overline{Q}_3$ output of the F.F. 73 is "H", the gate 84 opens and its output becomes "H". Due to this, the F.F. 73 is set and its output $Q_3$ becomes "H", while the $\overline{Q}_3$ output becomes "L", so that the gate 84 is closed. On the other hand, the "H" output from the gate 84 is supplied through the gate 80 to a reset input terminal R of the counter 90, so that the counter 90 is reset and its count value becomes zero and at the same time an output of the decoder 91 becomes "L".

The counter 90 subsequently continues counting from the count value of zero and when its count value coincides with the value $N_1$ of the data $D_1$ from the terminal 63, "H" is output from the decoder 92. The F.F. 72 is reset by the "H" output from this decoder 92 and its output $Q_2$ of the F.F. 72 becomes "L", while the output $\overline{Q}_2$ becomes "H". In addition, the "H" output from this decoder 92 is also supplied through the gate 80 to the reset input terminal R of the counter 90, so that the counter 90 is again reset and its count value becomes zero, and at the same time the output of the decoder 92 becomes "L".

The counter 90 further again continues counting from the counter value of zero and when its count value again becomes $N_0$, a "H" signal is output from the decoder 91. Also, since the $\overline{Q}_2$ output of the F.F. 72 is "H", the output of the gate 83 becomes "H", so that the F.F. 71 is reset and its output $Q_1$ becomes "L". Thus, the gate 82 is closed, causing the counting operation of the counter 90 to be stopped. On the other hand, since the "H" output from the gate 83 is supplied through the gate 80 to the reset input terminal R of the counter 90, the counter 90 is reset and its count value becomes zero, and at the same time the output of the decoder 91 becomes "L". Furthermore, the "H" output from this gate 83 is input through the gate 81 to the reset input terminal R of the F.F. 73 and its output $Q_3$ becomes "L". The output $Q_3$ of this F.F. 73 is output from a terminal 65 as the head switching signal $Q_3$.

Now assuming that the frequency of the clock $CP_1$ is $f_1$, the count time $T_0$ ($T_0$ in FIG. 5) of $N_0$ and the count time $T_1$ ($T_1$ in FIG. 5) of $N_1$ of the counter 90 are given by the following expressions.

$$T_0 = N_0/f_1 \qquad (1)$$

$$T_1 = N_1/f_1 \qquad (2)$$

$$T = T_0 + T_1 \qquad (3)$$

As is obvious from the above description, the $Q_1$ output of the F.F. 71 becomes "H" in the interval $(T_0+T_1+T_0)$ when the counter 90 counts only $(N_0+N_1+N_0)$; the $Q_2$ output of the F.F. 72 becomes "H" in the interval $(T_0+T_1=T)$ when the counter 90 counts only $(N_0+N_1)$; and the $Q_3$ output of the F.F. 73, i.e., the head switching signal $Q_3$ also becomes "H" in the same interval $(T_1+T_0=T)$ when the counter 90 counts only $(N_1+N_0)$.

Therefore, the above-mentioned $Q_2$ output of the F.F. 72 becomes the signal which precedes the head switching signal $Q_3$ by just only time $T_0$ (hereinbelow, this signal is referred to as a precedence signal $Q_2$). This precedence signal $Q_2$ is output from a terminal 64.

Here, the values of the above-mentioned $N_0$ and $N_1$ (value of the data $D_1$) are determined so as to satisfy the following expression.

$$T = 1/2f \qquad (4)$$

wherein, f is the frequency of the reference signal from the reference signal generator 30 of FIG. 3 as mentioned previously; its frequency f is determined by the data $D_2$ from the data producing circuit 50.

In addition, in case of the first reproducing mode whereby the magnetic tape 4 is run at a standard speed by a capstan servo circuit (not shown) in the well known manner and thereby to reproduce the video signal, the value of the above data $D_2$ is determined so that the frequency f of the above reference signal is substantially equal to the frame frequency $f_0$ of the video signal. While the values of $N_0$ and $N_1$ (value of the data $D_1$) are determined so as to satisfy the above expression (4), that is to say, in the manner such that the interval T, when the precedence signal $Q_2$ and head switching signal $Q_3$ from the output terminals 64 and 65 are "H", is substantially equal to the field period T' ($=1/2f_0$) of the video signal.

Then, in case of the second reproducing mode whereby the magnetic tape 4 is run at a speed different from the standard speed and thereby to specially reproduce, such as high speed reproduction or still reproduction, the values of the above-mentioned $N_0$ and $N_1$ and data $D_1$ and $D_2$ are determined so as to satisfy the above expression (4) in the similar manner as in the first reproducing mode.

In this second reproducing mode, since the relative speed to be determined by the rotating speed of the magnetic heads 10 and 20 and the running speed of the magnetic tape 4 is different from that in the recording mode, an offset is caused in the horizontal scanning frequency of the reproduction video signal different from the normal frequency. Therefore, the horizontal pull in of the TV receiver cannot be held, so that there occurs a problem such that a so-called pull out is caused or color shading is caused due to the occurrence of time difference between a luminance signal and a chrominance signal. To solve this problem, it is necessary to add constant deviation to the rotating speed of the magnetic heads 10 and 20, thereby eliminating the offset of the horizontal scanning frequency of the reproduction video signal. For example, in the second reproducing mode, if the deviation value of the rotational frequency to be added to the rotating speed of the magnetic heads 10 and 20 is set into $\Delta f$, the value of the data $D_2$ is determined so that the frequency f of the reference signal from the reference signal generator 30 becomes $f = f_0 + \Delta f$; in accordance with this value, $N_0$ and $N_1$ (value of the data $D_1$) are determined so that the above-mentioned T is $$T = \frac{1}{2(f_0 + \Delta f)}.$$

That is to say, practically, the value $N_1$ of the data $D_1$ is set so that the following expressions are satisfied from the above expressions (1)–(4), i.e., $$N_0 + N_1 = \frac{f_1}{2f_0} \qquad (5)$$

in the first reproducing mode, while $$N_0 + N_1 = \frac{f_1}{2(f_0 + \Delta f)} \qquad (6)$$

in the second reproducing mode, respectively. In addition, $N_0$ is set into the same constant value in these modes. Therefore, the precedence signal $Q_2$ and head switching signal $Q_3$ which are produced and output by the circuit 60 are phase synchronized with the phase of the reference signal from the circuit 30 due to the negative feedback control operation of the head disk servo system in any of the above-described first and second modes. Thus, it is controlled such that their frequencies are equal to the frequency f of the reference signal, while their duty ratios are always 50% from the above expression (4).

As described above, since the duty ratios of the precedence signal $Q_2$ and head switching signal $Q_3$ become 50% accurately, a stable reproduction can be performed. Also, it is possible to stably produce the false vertical sync signal necessary to perform a special reproducing function by way of these signals $Q_2$ and $Q_3$.

Two false vertical sync signals $V_1$ and $V_2$ having different phases are needed to perform the high speed reproduction or still reproduction, these signals are produced as follows. That is to say, the first false vertical sync signal $V_1$ is produced, as shown by $V_1$ of FIG. 5, at the leading edge of the head switching signal $Q_3$, in other words, in the manner such that it has the phase which was delayed by $T_0$ from the leading edge of the precedence signal $Q_2$ and its pulse width is $\tau_0$. As shown by $V_2$ of FIG. 5, the second false vertical sync signal $V_2$ is produced such that it has the phase which was delayed by $T_0'$ from the trailing edge of the precedence signal $Q_2$ and its pulse width is similarly $\tau_0$. These two signals $V_1$ and $V_2$ are synthesized to produce one continuous false vertical sync signal V (V in FIG. 5). This false vertical sync signal V is added to the reproduction video signal by a reproduction video signal circuit (not shown). In order to perform various special reproduction such as high speed reproduction or still reproduction and the like, it is necessary to change the phase of the false vertical sync signal in accordance with the values of so-called H and ($\alpha_H$), so that its phase adjustment range is needed to be set into a wide range for this purpose. However, as described above, since the false vertical sync signal V is produced from the signal $Q_2$ which is preceded by only time $T_0$ from the head switching signal $Q_3$, it is possible to set the phase adjustment range ($T_0'$ in FIG. 3) to be sufficiently larger than that by the conventional method (V in FIG. 2) as described with respect to FIG. 2, and at the same time this enables one of the phase control circuits for that purpose to be omitted. Furthermore, as described before, since the duty ratio of this precedence signal $Q_2$ is always 50% in the various special reproducing mode, a desired false vertical sync signal can be stably obtained without any phase variation, thereby enabling the stable reproduction to be performed without causing any vertical fluctuation of the reproduced picture image.

Also, in the above special reproducing modes, in place of the signal $Q_3$, it may be possible to use, as the head switching signal, a signal $Q_3'$ which becomes "H" in the field where the false vertical sync signal $V_1$ is present and becomes "L" in the field where the false vertical sync signal $V_2$ is present as indicated by $Q_3'$ of FIG. 5. Although the duty ratio of this signal $Q_3'$ is not always 50%, this will not cause any problem.

In addition, a so-called 8 mm video tape recorder is being studied as a new standard VTR. In this video tape recorder, many methods have been newly proposed whereby a time-base compressed audio signal is recorded in the socalled overlapped portion where the heads 10 and 20 simultaneously scan on the tape 4, or in case of performing the reproduction tracking by perturbing the heads 10 and 20, the pilot signal necessary to control the positions of the heads 10 and 20 upon the recording is recorded in this overlapped portion, or the like. However, according to the present invention, even in such a video tape recorder, it is of course possible to apply the invention and to allow the position designation and position detection of each signal which is recorded in or reproduced from the above-mentioned overlapped portion to be stably and certainly performed using the stable precedence signal $Q_2$ which precedes in time the head switching signal $Q_3$, and it is unnecessary to particularly provide a phase control circuit for that purpose.

From the above description, it will be appreciated that the reliability and performance of the apparatus can be improved and also the phase control circuit and its input circuit and the like are more simplified than a conventional apparatus, so that the integration for producing an IC becomes easy and this produces effects such as the reduction of the adjustment, simplification of the adjustment procedure, decrease in the number of peripheral circuits, etc., and at the same time this contributes to the realization of a low-priced apparatus.

Figure 6:
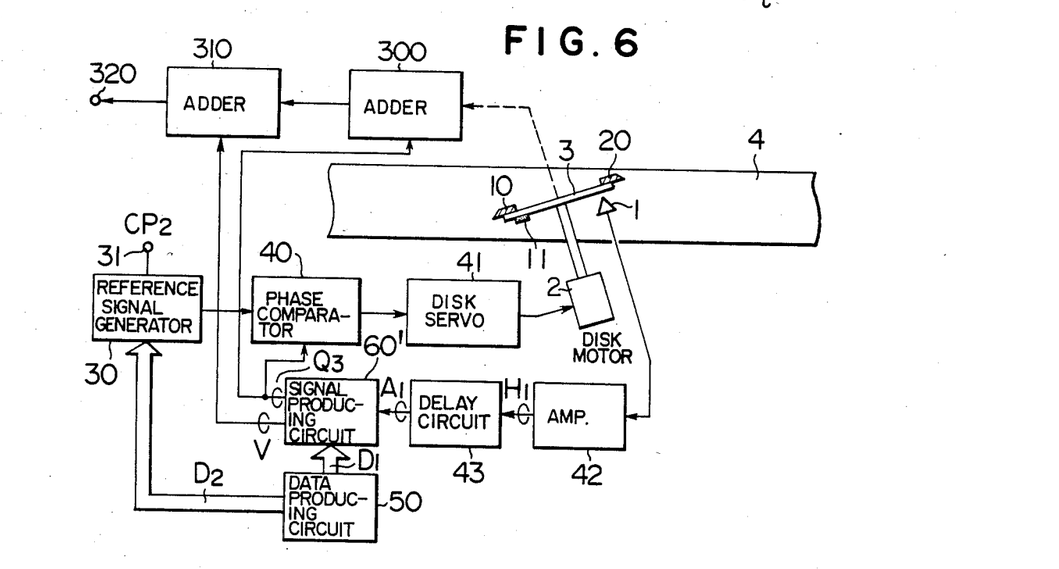
FIG. 6 is a block diagram illustrating another embodiment of the present invention.
Figure 7:
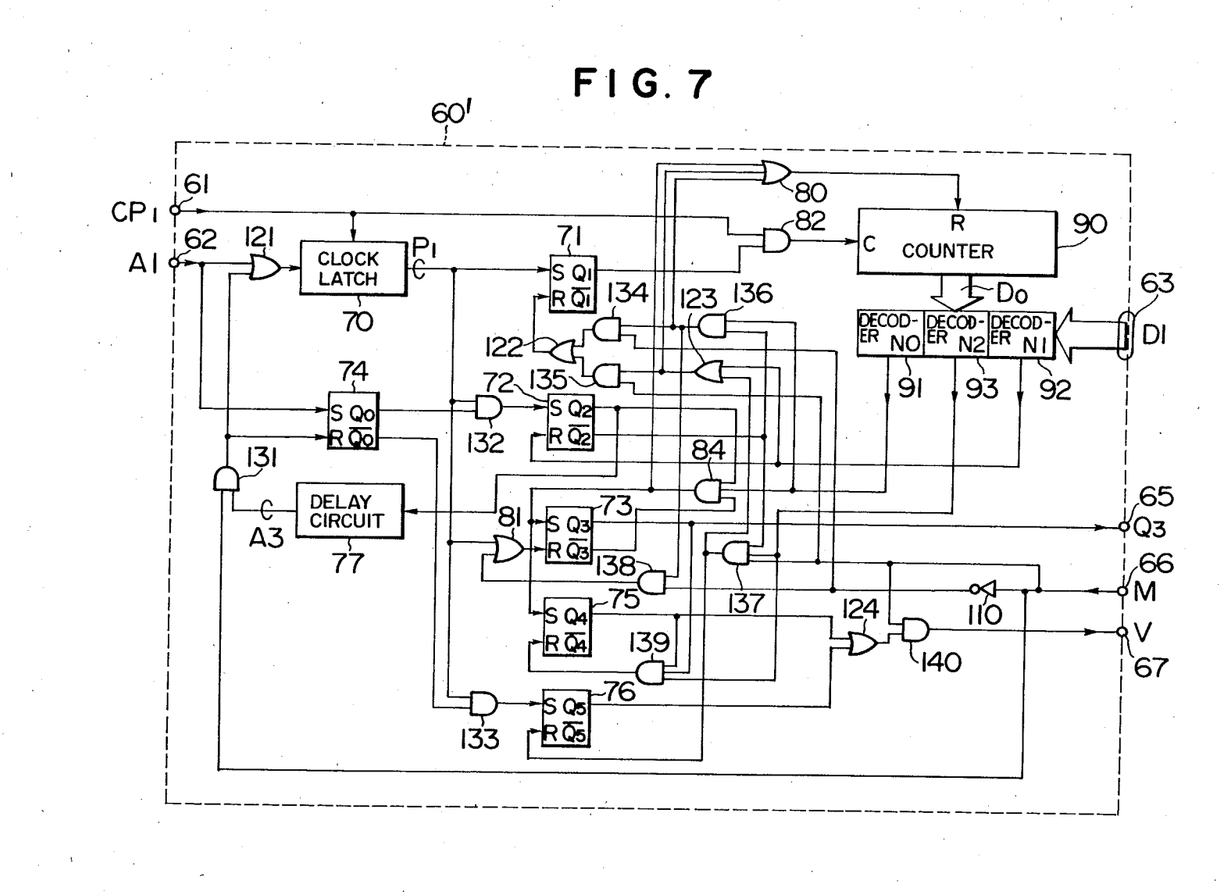
FIG. 7 is a block diagram showing one embodiment of a circuit for producing a head switching signal and a false vertical sync signal according to the present invention.
Figure 8:
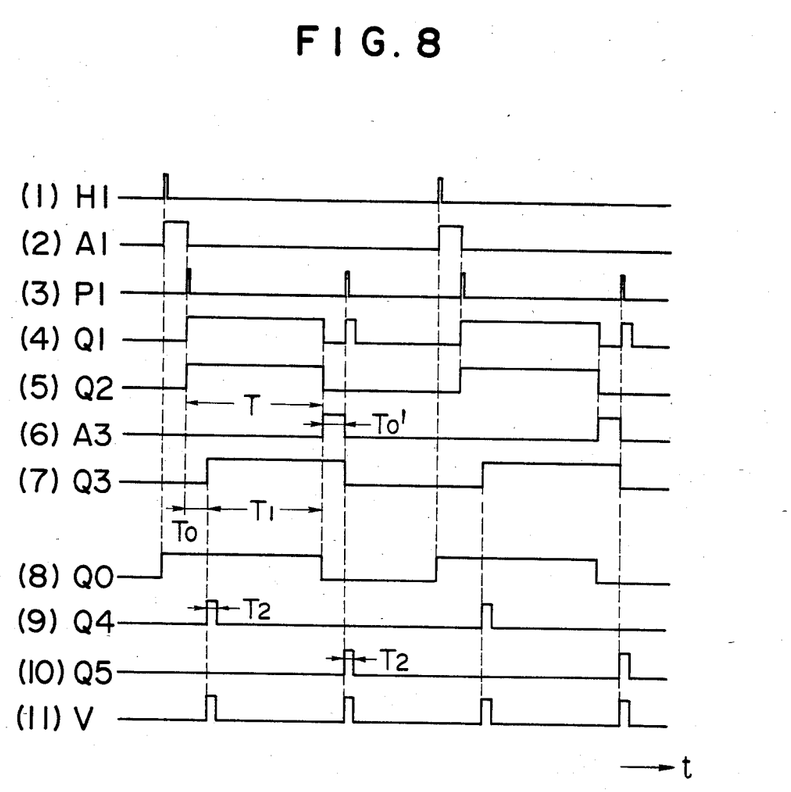
FIG. 8 shows a waveform diagram to explain its operation.

FIGS. 6–8 show other embodiments of the present invention, in which FIG. 6 is a block diagram illustrating one embodiment of the head disk servo system in the reproducing mode which is constituted using the circuit 60' for producing the head switching signal and false vertical sync signal according to the present invention; FIG. 7 is a block diagram showing one embodiment of the circuit 60' for producing the head switching signal and false vertical sync signal according to the present invention; and FIG. 8 shows the waveforms of the outputs at the main parts thereof. In FIG. 6, the reference numeral 60' denotes the circuit for producing the head switching signal $Q_3$ and the false vertical sync signal V necessary to execute the special reproducing functions as mentioned before; and 310 represents an adder which serves to add, the false vertical sync signal V from the circuit 60' to the reproduction video signal from the reproduction video signal circuit 300 and to introduce them to a terminal 320. The other components are the same as those shown in FIG. 3 and these same components are designated by the same reference numerals, and their detailed descriptions are omitted.

The operation of the circuit 60' for producing the head switching signal and false vertical sync signal will now be described on the basis of the embodiment of FIG. 7.

In FIG. 7, a reference numeral 61 denotes the input terminal of the clock $CP_1$; 62 is the input terminal of the output $A_1$ from the delay circuit 43 of FIG. 6; 63 is the input terminal of the n-bit data $D_1$ from the data producing circuit 50; 65 is the output terminal of the head switching signal $Q_3$; 66 is an input terminal of a mode designation signal M; and 67 is an output terminal of the false vertical sync signal V. A numeral 70 is the clock latch circuit; 71–76 are R/S flip flops (hereinafter, abbreviated as F.F.); 77 is a delay multi circuit; 110 is an inverter; 80, 81, and 121–124 are OR gates; 82, 84, and 131–140 are AND gates; and 90 is the n-bit counter. Numerals 91, 92 and 93 are the decoders for decoding the count value of the counter 90, in which the decoders 91 and 93 output an "H" signal when the count value of the counter 90 becomes $N_0$ and $N_2$, respectively, while the decoder 92 compares the count data $D_0$ of the counter 90 with the data $D_1$ from the input terminal 63 and when they coincide, i.e., when the count value of the counter 90 is equal to the value $N_1$ of the data $D_1$, it outputs an "H" signal.

Both $N_0$ and $N_2$ are determined so as to be smaller than $N_1$ ($N_0$, $N_2 < N_1$) and when it is assumed that the frequency of the clock $CP_1$ is $f_1$, the count time $T_0$ of $N_0$ and the count time $T_1$ of $N_1$ by the counter 90 are given by the previously-mentioned expressions (1) and (2). While, the count time $T_2$ of $N_2$ is given by the following expression $$T_2 = N_2/F_1 \qquad (7)$$

while, $$T = T_0 + T_1 \qquad (3)$$

In addition, the value of $N_0$ and the value of $N_1$ (value of the data $D_1$) are determined so as to satisfy the above-mentioned expression (4).

Namely, in the first reproducing mode whereby the magnetic tape is run at the same standard speed as in the recording mode, the value of the above data $D_2$ is determined so that the frequency f of the reference signal is substantially equal to the frame frequency $F_0$ of the video signal and the values of $N_0$ and $N_1$ (value of the data $D_1$) are determined so as to satisfy the expression (4).

In addition, even in the second reproducing mode whereby the magnetic tape 4 is run at a speed different from the standard speed, thereby performing the special reproduction such as high speed reproduction or still reproduction or the like, the data $D_1$ and $D_2$, and the values of $N_0$ and $N_1$ are determined so as to satisfy the above expression (4).

In this second reproducing mode, since the relative speed to be determined by the rotating speed of the magnetic heads 10 and 20 and the running speed of the magnetic tape 4 is different from that in the recording mode, an offset is caused in the horizontal scanning frequency of the reproduction video signal different from the normal frequency. Therefore, the horizontal pull in of the TV receiver cannot be held, so that there occurs a problem such that a so-called pull out is caused or color shading is caused due to the occurrence of a time difference between the luminance signal and the chrominance signal. To solve this problem, it is necessary to add a constant deviation to the rotating speed of the magnetic heads 10 and 20, thereby eliminating the offset of the horizontal scanning frequency of the reproduction video signal. For example, in the second reproducing mode if the deviation value of the rotational frequency to be added to the rotating speed of the magnetic heads 10 and 20 is set to $\Delta F$, the value of the data $D_2$ is determined so that the frequency f of the reference signal from the reference signal generator 30 becomes $f = f_0 + \Delta f$; in accordance with this value, $N_0$ and $N_1$ (value of the data $D_1$) are determined so that the above-mentioned T is $$T = \frac{1}{2(f_0 + \Delta f)}.$$

That is to say, practically, the value $N_1$ of the data $D_1$ is set so that the following expressions are satisfied from the above expressions (1)-(4), i.e., $$N_0 + N_1 = \frac{f_1}{2f_0} \quad (5)$$

in the first reproducing mode, while $$N_0 + N_1 = \frac{f_1}{2(f_0 + \Delta f)} \quad (6)$$

in the second reproducing mode, respectively.

The mode designation signal M to be input to the terminal 66 is an "L" signal in the first reproducing mode and is an "H" signal in the second reproducing mode.

The circuit operation of FIG. 7 will now be described.

Firstly, the operation in the first reproducing mode will be described using the waveform diagram of FIG. 5. In the first reproducing mode, the mode designation signal M from the terminal 66 is "L", so that the gates 131, 135, 137 and 140 are closed and the false vertical sync signal is not output from the terminal 67. The F.F. 75 and 76, a delay circuit (e.g. multivibrator) 77 and a decoder 93 relate to the production of the false vertical sync signal V and since the false vertical sync signal is unnecessary in this first reproducing mode, its operation is omitted. The signal $A_1$ ($A_1$ in FIG. 5) from the terminal 62 is supplied through the gate 121 to the clock latch circuit 70, so that the pulse $P_1$ ($P_1$ in FIG. 5) which is synchronized with the clock $CP_1$ from the terminal 61 is produced from the trailing edge of the signal $A_1$ and is output. The F.F. 74 is set in response to the signal $A_1$ and since the gate 131 is closed, the F.F. 74 is not reset, so that its $Q_0$ output is always "H". The output $P_1$ from the circuit 70 is supplied to a set input S of the F.F. 71, through the gate 132 to a set input S of the F.F. 72; and through the gate 81 to a reset input R of the F.F. 73. Thus, a $Q_1$ output ($Q_1$ in FIG. 5) of the F.F. 71 becomes "H"; a $Q_2$ output ($Q_2$ in FIG. 5) of the F.F. 72 becomes "H" and a $\overline{Q}_2$ output becomes "L"; and a $Q_3$ output ($Q_3$ in FIG. 5) of the F.F. 73 becomes "L" and a $\overline{Q}_3$ output becomes "H". When the $Q_1$ output of the F.F. 71 becomes "H", the gate 82 opens and the clock $CP_1$ from the terminal 61 is input to a clock input C of the counter 90, so that the counter 90 starts counting from the count value of zero. When the count value of the counter 90 becomes $N_0$, the output from the decoder 91 becomes "H" and the $Q_2$ output of the F.F. 72 becomes "H" and the $\overline{Q}_3$ output of the F.F. 73 becomes "H", so that the output of the gate 84 becomes "H". Thus, the F.F. 73 is set and its output $Q_3$ becomes "H", while the $\overline{Q}_3$ output becomes "L", so that the gate 84 is closed. On the other hand, the "H" output from the gate 84 is supplied through the gate 80 to a reset input terminal R of the counter 90, causing the counter 90 to be reset and its count value becomes zero, at the same time the output of the decoder 91 becomes "L". The counter 90 subsequently continues counting from the count value of zero and when the count value coincides with the value $N_1$ of the data $D_1$ from the terminal 63, a "H" signal is output from the decoder 92. This "H" output from the decoder 92 allows the F.F. 72 to be reset and its output $Q_2$ becomes "L", while the $\overline{Q}_2$ output becomes "H". In addition, the "H" output from this decoder 92 is supplied through the gates 123 and 80 to the reset input terminal R of the counter 90, so that the counter 90 is again reset and its count value becomes zero and at the same time the output of the decoder 92 becomes "L". The counter 90 further continues counting again from the count value of zero and when the count value again becomes $N_0$, an "H" signal is output from the decoder 91. Since the $\overline{Q}_2$ output of the F.F. 72 is "H", the gate 136 opens and its output is "H" and further the output of the inverter 110 is "H", so that the gate 134 also opens and its output becomes "H". Thus, the F.F. 71 is reset through the gate 122 and its output $Q_1$ becomes "L" and the gate 82 is closed, so that the counting operation of the counter 90 is stopped. On the other hand, the "H" output from the gate 136 is supplied through the gate 80 to the counter 90, so that the counter 90 is reset and its count value becomes zero and at the same time the output of the decoder 91 becomes "L". Furthermore, the "H" output from this gate 136 is supplied through the gates 138 and 81 to the reset input terminal R of the F.F. 73, so that its output $Q_3$ becomes "L".

The output $Q_3$ of this F.F. 73 is output from the terminal 65 as the head switching signal $Q_3$. The interval when this head switching signal $Q_3$ becomes "H" is equal to the interval T ($=T_1+T_0$) when the counter 90 counts only ($N_1+N_0$), while the interval when the output $Q_2$ of the F.F. 72 becomes "H" is similarly equal to the interval T ($=T_0+T_1$) when the counter 90 counts only ($N_0+N_1$). As is obvious from FIG. 5, this output $Q_2$ is the signal which precedes the head switching signal $Q_3$ by just only time $T_0$.

The operation in the second reproducing mode will now be described using the waveform diagram of FIG. 8.

In the second reproducing mode, the mode designation signal M becomes "H", while the output of the inverter 110 becomes "L", so that the gates 134 and 138 are closed. The F.F. 74 is set in response to the signal $A_1$ from the terminal 62 and its output $Q_0$ ($Q_0$ in FIG. 8) becomes "H". The F.F. 71 and 72 are set in response to the pulse $P_1$ produced by the circuit 70 by the trailing edge of the signal $A_1$, while the F.F. 73 is reset, so that the respective outputs $Q_1$ and $Q_2$ become "H" and the output $Q_3$ becomes "L". The clock is supplied to the counter 90 and it therefore starts counting. After the counter 90 has counted only $N_0$, an "H" signal is output from the decoder 91, and this permits the F.F. 73 to be set through the gate 84, so that its output $Q_3$ becomes "H" and the F.F. 75 is also set and its output $Q_4$ ($Q_4$ in FIG. 8) also becomes "H". At the same time the counter 90 is reset through the gate 80 and the count value becomes zero, so that the output of the decoder 91 becomes "L". The above operation is substantially identical to that in case of the first reproducing mode.

The counter 90 subsequently continues counting and when the count value becomes $N_2$, an "H" signal is output from the decoder 93. Since the $Q_3$ output of the F.F. 73 becomes "H" and the $Q_4$ output of the F.F. 75 becomes "H", the gate 139 opens and its output becomes "H". Thus, the F.F. 75 is reset and its output $Q_4$ becomes "L". The interval when the output $Q_4$ of this F.F. 75 becomes "H" is equal to the interval $T_2$ (expression (7) mentioned before) when the counter 90 counts only $N_2$.

The counter 90 subsequently counts and when the count value becomes $N_1$, an "H" signal is output from the decoder 92. This causes the F.F. 72 to be reset and its output $Q_2$ changes from "H" to "L". At the same time the F.F. 71 is also reset through the gates 123, 135 and 122 and its output $Q_1$ becomes "L", so that the gate 82 is closed and the counter 90 stops counting. Furthermore, the counter 90 is also reset through the gates 123 and 80 and its count value becomes zero, this causes the output of the decoder 92 to become "L". On the other hand, the output $Q_2$ of the F.F. 72 is input to the delay circuit (e.g. multivibrator) 77 and is triggered by the trailing edge from "H" to "L" of the $Q_2$ signal, so that a pulse $A_3$ ($A_3$ in FIG. 8) (having a pulse width $T_0'$) which was delayed by only time $T_0'$ is output from the circuit 77. This pulse $A_3$ is supplied through the gate 131 to a reset input terminal R of the F.F. 74 and its output $Q_0$ becomes "L", while the $\overline{Q_0}$ output becomes "H". In addition, the pulse $A_3$ is supplied through the gates 131 and 121 to the circuit 70, so that the pulse $P_1$ is produced by the trailing edge of the pulse $A_3$ in the same manner as in the case of $A_1$ and is output.

The F.F. 71 is set by the output $P_1$ from this circuit 70 and the output $Q_1$ again becomes "H", causing the gate 82 to open and the counter 90 to restart counting from the count value of zero. On the other hand, the F.F. 73 is reset through the gate 81 in response to this pulse $P_1$ and its output $Q_3$ becomes "L". Also, the F.F. 76 is set through the gate 133 and its output $Q_5$ ($Q_5$ in FIG. 8) becomes "H". When the count value of the counter 90 becomes $N_2$, the output of the decoder 93 again becomes "H" and since the $\overline{Q_2}$ output of the F.F. 72 is "H", the gate 137 opens and its output becomes "H". Due to this the F.F. 76 is reset and its output $Q_5$ becomes "L". At the same time the counter 90 is reset through the gates 123 and 80 and the count value becomes zero, so that the output of the decoder 93 becomes "L". The interval when the output $\overline{Q_5}$ of this F.F. 76 becomes "H" is equal to time $T_2$ similarly to the output $Q_4$ of the F.F. 75 mentioned above. The output $Q_4$ of the F.F. 75 and the output $Q_5$ of the F.F. 76 are added by the gate 124 and are output as the false vertical sync signal V (V in FIG. 8) through the gate 140 from the terminal 67.

In the second reproducing mode, the output $Q_2$ of the F.F. 72 is preceded by only time $T_0$ from the head switching signal $Q_3$ as the output of the F.F. 73 similarly to the case of the first reproducing mode, and the interval when this precedence signal $Q_2$ becomes "H" is equal to T. In addition, as is obvious from FIG. 8 also, the false vertical sync signal V can be regarded as the signal produced from this precedence signal $Q_2$. Practically, the false vertical sync signal V is produced so as to have a phase which is respectively delayed by times $T_0$ and $T_0'$ from the leading edge and trailing edge of the precedence signal $Q_2$ and to have a pulse width of $T_2$.

In this way, the head switching signal $Q_3$ and precedence signal $Q_2$ to be produced and output are phase synchronized with the reference signal from the reference signal generator 30 due to the negative feedback control operation of the head disk servo system even in the first and second reproducing modes; therefore, their frequencies are equal to the frequency f of the reference signal. In addition, since T has been determined so as to satisfy the above expression (4), its duty ratio is always 50%.

In the second reproducing mode, if $T_0 \neq T_0'$, the duty ratio of the head switching signal $Q_3$ will not become 50%, but this will not cause any inconvenience and no problem will occur.

As described above, since the duty ratios of the head switching signal $Q_3$ and precedence signal $Q_2$ become accurately 50%, the reproduction can be stably performed. Also, it is possible to reduce the phase control circuit for producing the head switching signal to one as compared with the conventional method of FIG. 1.

In addition, in order to perform various special reproductions such as high speed reproduction, low speed reproduction, or still reproduction, etc., it is necessary to change the phase of the false vertical sync signal in accordance with the values of so-called H and ($\alpha_H$), and with the track trace condition of the magnetic heads, etc. Although it is necessary to set the phase adjustment range to be wider for that purpose, since the false vertical sync signal V is produced from the signal $Q_2$ which precedes in time the head switching signal $Q_3$ as already described before, it is possible to set a wider phase adjustment range ($T_0'$ in FIG. 8) than that by the conventional method mentioned with respect to FIG. 2, and it is also possible to reduce the phase control circuit for that purpose to one. In addition, since the duty ratio of the precedence signal $Q_2$ is always 50% as described before, a desired false vertical sync signal can be stably obtained without any phase variation, so that the stable reproduction can be performed without causing any vertical fluctuation of a reproduced picture, thereby enabling the apparatus which can cope with a number of various reproducing modes to be provided.

Moreover, in the embodiment of FIG. 7, the case has been shown whereby the values of $N_0$ in both first and second reproducing modes are identical; however, the present invention is not limited to this and the value of $N_0$ may vary in the first and second modes.

In addition, the case has been shown whereby the phase of one (output $Q_5$ of the F.F. 76) of the false vertical sync signals can be adjusted using the delay circuit 77 in the embodiment of FIG. 7; however, it may be possible to use a circuit which fixedly obtains the delay time $T_0'$ to be unconditionally determined for the specific reproducing mode. For example, although not shown, a method may be adopted whereby: the counter 90 is commonly used and the counter 90 continuously counts only $N_0'$ ($=T_0'.f_1$) in the interval (interval of $T_0'$ of FIG. 8) until the next $N_2$ after the counting of $N_1$ has been finished is started counting; the F.F. 76 is set at the end of the counting of its $N_0'$; the F.F. 76 is reset at the end of the counting of $N_2$ subsequent to it, thereby obtaining a desired output $Q_5$.

Furthermore, in the embodiment of FIG. 7, an example of application has been shown in the case where two kinds of false vertical sync signals $Q_4$ and $Q_5$ which have different phases and repeat at the two-field period are respectively individually produced in the case of high speed reproduction or still reproduction, etc. However, the present invention is not limited to this, for example, even in the mode whereby the reproduction is performed at a speed of ½ of the standard speed which needs four kinds of false vertical sync signals which repeat at four field period, one of those four signals is produced digitally with a fixed phase such as the output $Q_4$ shown in the embodiment, while with respect to the other three signals, desired false vertical sync signals can be produced by respectively individually phase controlling by the three delay circuits (e.g. multivibrators) and at the same time by circularly making these circuits operative, such as the output $Q_5$ in the embodiment.

Furthermore, in the embodiment of FIG. 7, the head disk servo system is constituted by a so-called phase control system and the frequency of the reference signal from the reference signal generator 30 is changed depending upon each mode. However, the present invention is not limited to this; i.e., it may be possible to constitute the system in a manner such that the head disk servo system is constituted by only the speed control system in at least the second mode and a predetermined deviation is added to the rotating speed of the magnetic heads according to its speed control and the data $D_1$ responsive to its deviation is supplied to only the signal producing circuit 60'.

In any of the above cases, the same effect can be obtained and it will not depart from the spirit of the present invention.

We claim:

1. A magnetic recording and reproducing apparatus in which two rotary magnetic heads are mounted on a rotary disk at an angle of 180° apart from each other and a video signal is recorded on a magnetic tape in the direction of width of said tape and this recorded video signal is reproduced therefrom during rotation of said rotary magnetic heads at a predetermined speed, said apparatus comprising:

means for detecting the rotational phase of either one of said two magnetic heads;

means for generating a predetermined clock signal;

counter means for counting the clock signal from said clock signal generating means and decoder means responsive to the count of said counter means for controlling said counter means to sequentially count first, second and third count values ($N_0$, $N_1$, $N_0$) each time of receipt of the output signal of said rotational phase detecting means;

means for setting said second count value ($N_1$) so that the sum ($N_0+N_1$) of the first and second sequential count values of said counter means is substantially equal to the value of the frequency of said clock signal divided by a frequency which is equal to twice the rotating speed of said magnetic heads; and signal producing circuit means for producing a head switching signal for sequencing the video signal to be recorded/reproduced by said two magnetic heads into one sequence signal on the basis of the count value of said counter means, including circuit means for outputting said head switching signal which is at either level or low level during the interval when said counter means is counting the second and third count values ($N_1$, $N_0$).

2. A magnetic recording and reproducing apparatus according to claim 1, wherein said signal producing circuit means for producing said head switching signal includes: first circuit means for outputting a precedence signal at a first level which precedes said head switching signal in the interval when said counter means is counting the first and second count values ($N_0$, $N_1$) on the basis of the output signal from said rotational phase detecting means and the second count value ($N_1$) of said counter means; second circuit means for outputting said head switching signal at the first level in the interval when said counter means is continuously counting the second and third count values ($N_1$, $N_0$) on the basis of the second and third count values ($N_1$, $N_0$) of said counter means; and third circuit means for resetting the counter means after the counter means finishes counting the first, second and third count values ($N_0$, $N_1$, $N_0$); thereby detecting the position of the signal to be recorded in or reproduced from the over-lapped portion on the magnetic tape where said two rotary magnetic heads simultaneously scan in response to said precedence signal.

3. A magnetic recording and reproducing apparatus according to claim 1, wherein said decoder means includes decoders which receive the count output of said counter means and respectively output first, second and third control signals when said count output reaches said first, second and third count values ($N_0$, $N_1$, $N_0$); and said signal producing circuit means includes first circuit means for outputting a precedence signal at high level in the count interval ($T_0+T_1$) when said counter means is counting the first and second count values ($N_0$, $N_1$) on the basis of the output signal of said rotational phase detecting means and said second control signal of said decoder means; second circuit means for outputting said head switching signal which is at high level and is delayed from said precedence signal by a count time ($T_0$) of the first count value ($N_0$) in the count interval ($T_1+T_0$) when said counter means is counting the second and third count values on the basis of said second and third control signals of said decoder means; and third circuit means which receives said first, second and third control signals and resets said counter means after the counter means finishes counting the first, second and third count values ($N_0$, $N_1$, $N_0$); thereby detecting the position of the signal to be recorded in or reproduced from the overlapping portion on said magnetic tape where said two rotary magnetic heads simultaneously scan in response to said precedence signal.

4. A magnetic recording and reproducing apparatus according to claim 3, wherein said first, second and third circuit means are constituted by logic circuits.

5. A magnetic recording and reproducing apparatus in which an information signal is recorded on a magnetic tape in the direction of the width thereof alternately for every field by two rotary magnetic heads mounted on a rotary disk at an angle of 180° from each other, and the recorded information signal is reproduced therefrom, by said rotary magnetic heads, said apparatus comprising:

means for detecting the rotational phase of either one of said two rotary magnetic heads and for producing a periodic output signal;

means for generating a clock signal of predetermined frequency;

counter means for counting in response to said clock signal, including a counter and means for controlling said counter (1) to start counting in response to the clock signal of said clock signal generating means upon receipt of said output signal of said rotational phase detecting means and to be set to an initial value or reset when said counter has counted up to a first count value ($N_0$), (2) to subsequently start counting in response to the clock signal from the initial or reset value and being again set to an initial value or reset when said counter has counted up to a second count value ($N_1$), and (3) finally to start counting the clock signal from the initial or reset value and finishing the counting when said counter has counted up to a third count value ($N_0$);

means for setting said second count value ($N_1$) so that the sum ($N_0+N_1$) of the first and second count values of said counter is substantially equal to a value obtained by dividing the freqeuncy of said clock signal by a frequency equal to twice the rotational speed of said rotary magnetic heads, including means for controlling said rotational speed of said magnetic heads so that the output signal of said rotational phase detecting means becomes a fixed frequency; and signal producing circuit means, responsive to the count value of said counter means, for producing a head switching signal for changing over said two rotary magnetic heads alternately, thereby to make the information signal recorded/reproduced alternately for every field a sequence of signals, said signal producing circuit means including circuit means whose state is inverted respectively by the outputs based on the first and third count values ($N_0$, $N_0$) thereby to output said head switching signal which is at either a "high" level or a "low" level during a period in which said counter means is successively counting the second and third count values ($N_1$, $N_0$).

6. A magnetic recording and reproducing apparatus according to claim 5, wherein said signal producing circuit means for producing said head switching signal includes: first circuit means for outputting a precedence signal at a first level which precedes said head switching signal in the interval when said counter means is counting the first and second count values ($N_0$, $N_1$) on the basis of the output signal from said rotational phase detecting means and the second count value ($N_1$) of said counter means; second circuit means for outputting said head switching signal at the first level in the interval when said counter means is continuously counting the second and third count values ($N_1$, $N_0$) on the basis of the second and third count values ($N_1$, $N_0$) of said counter means; and third circuit means for resetting the counter means after the counter means finishes counting the first, second and third count signal to be recorded in or reproduced from the overlapping portion on the magnetic tape where said two rotary magnetic heads simultaneously scan in response to said precedence signal.

7. A magnetic recording and reproducing apparatus according to claim 1, wherein said decoder means includes decoders which receive the count output of said counter means and respectively output first, second and third control signals when said count output reaches said first, second and third count values ($N_0$, $N_1$, $N_0$); and said signal producing circuit means includes first circuit means for outputting a precedence signal at high level in the count interval ($T_0+T_1$) when said counter means is counting the first and second count values ($N_0$, $N_1$) on the basis of the output signal of said rotational phase detecting means and said second control signal of said decoder means; second circuit means for outputting said head switching signal which is at high level and is delayed from said precedence signal by a count time ($T_0$) of the first count value ($N_0$) in the count interval ($T_1+T_0$) when said counter means is counting the second and third count values on the basis of said second and third control signals of said decoder means; and third circuit means which receives said first, second and third control signals and resets said counter means after the counter means finishes counting the first, second and third count values ($N_0$, $N_1$, $N_0$); thereby detecting the position of the signal to be recorded in or reproduced from the overlapped portion on said magnetic tape where said two rotary magnetic heads simultaneously scan in response to said precedence signal.

8. A magnetic recording and reproducing apparatus according to claim 7, wherein said first, second and third circuit means are constituted by logic circuits.

9. In a magnetic picture recording and reproducing apparatus for recording a video signal in and reproducing the same from a megnatic tape by two rotary magnetic heads:

a head switching signal producing apparatus comprising:

a detecting circuit for detecting the rotational phase of either one of said magnetic heads and for producing a periodic output;

a counter means for counting in response to a predetermined clock signal, including a counter and control means for controlling said counter to effect a first counting operation for allowing said counter to start counting in response to said clock signal upon receipt of the output from said detecting circuit to count only a predetermined count value ($N_0$) and be thereafter reset, a second counting operation following said first counting operation for subsequently counting only a set value ($N_1$), and a third counting operation following said second counting operation for further subsequently counting only the count value ($N_0$) again; and means for setting said value ($N_1$) so that the value ($N_0+N_1$) which said counter counts in successive operations is substantially equal to the value of the frequency of said clock divided by a frequency which is equal to twice the rotating speed of said magnetic heads so that the output signal of said rotational phase detecting circuit may have a predetermined frequency;

whereby on the basis of the output from said first counting operation of said counter and the output from said third counting operation, the head switching signal is produced, said head switching signal being at high level (or low level) in the count interval when said counter is continuously counting the count value ($N_1+N_0$) and is at low level (or high level) in the other intervals.

10. A head switching signal producing apparatus according to claim 9, wherein said counter means includes means for producing a precedence signal which precedes in time said head switching signal which is at high level (or low level) in the count interval when said counter is counting ($N_0+N_1$) in successive counting operations and is at low level (or high level) in the other intervals on the basis of the output from said detecting circuit and the output of said counter during said second counting operation thereby detecting the position of the signal to be recorded in or reproduced from the overlapped portion on said magnetic tape where said two rotary magnetic heads simultaneously scan in response to said precedence signal.

11. A magnetic recording and reproducing apparatus including first and second rotary magnetic heads counted on a rotary disk at an angle of 180° form each other, in which recording tracks for first and second channels are formed on a magnetic tape in a slanting direction by rotation of said two rotary heads, and information signals for first and second channels are applied to said magnetic heads so as to be alternately recorded on the first and second channel recording tracks, and the recorded information signals are reproduced by said magnetic heads, said apparatus comprising:
   means for detecting the rotational phase of either one of said first and second magnetic heads and producing a periodic output signal;
   means for generating a clock signal of predetermined frequency; and
   signal producing means responsive to receipt of the output signal of said rotational phase detecting means for counting in response to the clock signal of said clock signal generating means and for producing a false vertical sync signal which is added to said information signal based on the count value of said counting operation;
said signal producing means including:
   (a) counter means for counting in response to said clock signal;
   (b) first circuit means upon receipt of the output signal of said rotational phase detecting means for starting the counting operation of said counter means;
   (c) second circuit means for setting said counter means to an initial value of resetting said counter means upon receipt of a count value output of said counter means equal to a first count value ($N_0$);
   (d) third circuit means operable subsequent to operation of said second circuit means for stopping the counting operation of said counter means and at the same time again setting said counter means to an initial value of resetting said counter means upon receipt of a count value output of said counter means equal to a second count value ($N_1$);
   (e) delay means responsive to receipt of the output of said counter means equal to said second count value ($N_1$) for producing a signal to restart the counting operation of said counter means and for delaying said signal for a predetermined time;
   (f) fourth circuit means responsive to receipt of the delayed signal from said delay means for restarting the counting operation of said counter means;
   fifth circuit means for setting said counter means to an initial value of resetting said counter means and at the same time for producing first and second false vertical sync signals upon receipt of a third count value ($N_2$) output of said counter means, the first count value ($N_0$) output of said counter and the output of said delay means when said counter means has counted up to the third count value ($N_2$) after the counting operation is restarted;
   (h) means for adding said first and second false sync signals to said information signal which is reproduced at a tape speed different from that used during recording; and
   (i) means for setting said second count value ($N_1$) so that the sum ($N_0+N_1$) of the first and second count values of said counter is substantially equal to a value obtained by dividing the frequency of said clock signal by a frequency equal to twice the rotational speed fo said rotary magnetic heads, including means for controlling said rotational speed of said rotary magnetic heads so that the output signal of said rotational phase detecting means becomes a fixed frequency.

12. An apparatus according to claim 11, wherein said counter means includes a counter which starts counting of said clock siganl upon receipt of an output of said first circuit means, resets the counting upon receipt of outputs of said second and fifth circuit means, stops and resets the counting upon receipt of an output of said third circuit means, and restarts the counting upon receipt of an output of said fourth circuit means; and including
   a decoder connected to said counter for respectively decoding said first, second and third count values ($N_0$, $N_1$, $N_2$), and wherein said fifth circuit means includes:
   a circuit for producing said first false vertical sync signal upon receipt of the outputs of said decoder corresponding to said first and third count values ($N_0$, $N_2$), and
   a further circuit for producing said second false vertical sync signal upon receipt of the output of said decoder corresponding to said third count value ($N_2$) and the output of said delay means.

13. An apparatus according to claim 11 wherein said signal producing means further includes:
   circuit means responsive to receipt of the first count value ($N_0$) of said counter means and the output of said delay means for producing said head switching signal.

14. A magnetic recording and reproducing apparatus including first and second rotary magnetic heads mounted on a rotary disk at an angle of 180° from each other, in which recording tracks for first and second channels are formed on a magnetic tape in a slanting direction by rotation of said two rotary needs, and information signals for first and second channels are applied to said magnetic heads so as to be alternately recorded on the first and second channel recording tracks, and the recorded information signals are reproduced by said magnetic heads, said apparatus comprising:

means for detecting a rotational phase of either one of said first and second magnetic heads and for producing a periodic output signal;

means for generating a clock signal of predetermined frequency; and signal producing means responsive to receipt of the output signal of said rotational phase detecting means for counting in response to the clock signal of said clock signal generating means and for producing a head switching signal based on the count value to change over said first and second rotary magnetic heads alternately and to form the information signals of said first and second channels into a sequence of signals, said signal producing means including:

(a) counter means for counting in response to said clock signal;

(b) first circuit means responsive to receipt of the output signal of said rotational phase detecting means for starting the counter operation of said counter means;

(c) second circuit means for setting said counter means to an initial value or resetting said counter means upon receipt of a count value output of said counter means equal to a first count value ($N_0$);

(d) third circuit operable subsequent to operation of said second circuit means for setting said counter means to an initial value or resetting said counter means upon receipt of a count value output of said counter means equal to a second count value ($N_1$);

(e) fourth circuit means operable subsequent to said third circuit means for stopping the counting operation of said counter means when said counter means has counted to a third count value ($N_0$);

(f) means for setting said second count value ($N_1$) so that a sum ($N_0+N_1$) of the first and second count values of said counter means is substantially equal to a value obtained by dividing the frequency of said clock signal by a frequency equal to twice the rotational speed of said rotary magnetic heads, including means for controlling said rotational speed of said rotary magnetic heads so that the output signal of said rotational phase detecting means becomes a fixed frequency; and (g) circuit means for producing said head switching signal upon receipt of the count vale output of said counter means, said circuit means receiving outputs based on the first and third count values ($N_0$, $N_0$) of said counter means and outputting said head switching signal at either a "high" or a "low" level during a period in which said counter means sequentially counts the second and third count values ($N_1$, $N_0$).

15. An apparatus according to claim 14, wherein said signal producing means further includes fifth circuit means for outputting a preceding signal at a first level which precedes in time said head switching signal, said preceding signal being outputted during a period in which said counter means is counting the first and second count values ($N_0$, $N_1$) upon receipt of the output signal of said rotational phase detecting means and the output of the second count value ($N_1$) of said counter means;

wherein said rotary magnetic heads in response to said preceding signal detect a position of a signal recorded on or reproduced from an overlapping portion on said magnetic tape, which portion is scanned by said first and second rotary magnetic heads simultaneously.

16. An apparatus according to claim 15, wherein said fifth circuit means includes a circuit for outputting said preceding signal at a "high" level during a counting period ($T_0+T_1$) of said first and second count values ($N_0$, $N_1$) upon receipt of the output signal of said rotational phase detecting means and an output based on the second count value ($N_1$) of said counter means, and wherein said circuit means outputs, upon receipt of an output based on the second and third count values ($N_1$, $N_0$) of said counter means, said head switching signal at a "high" level during a counting period ($T_1+T_0$) of the second and third count values ($N_1$, $N_0$) and lagging from said preceding signal by a counting period ($T_0$) of the first count value ($N_0$).

17. An apparatus according to claim 14, wherein said counter means includes a counter which starts counting in response to said clock signal upon receipt of the output of said first circuit means, is reset upon receipt of output signals of said second and third circuit means, and stops the counting in response to said clock signal upon receipt of an output of said fourth circuit means; and a decoder connected to said counter for respectively decoding said first, second and third count values ($N_0$, $N_1$, $N_0$).

18. An apparatus according to claim 17, wherein said first, second third and fourth circuit means are formed respectively by logic circuits.

19. An apparatus according to claim 14, wherein said signal producing means further includes:

sixth circuit means for producing and outputting a signal ($A_3$) at either a "high" level or a "low" level during a counting period ($T_O$) of said first count value ($N_0$) or during a period ($T_0'$) nearly equal to the counting period ($T_0$), at the completion time of the counting of the second count value ($N_1$) of said counter means;

seventh circuit means for producing and outputting a first false vertical sync signal ($Q_4$) at the completion time of the counting of the first count value ($N_0$) of said counter means upon receipt of an output based on the first count value ($N_0$) and an output based on said head switching signal;

eighth circuit means for producing and outputting a second false vertical sync signal ($Q_5$) upon receipt of an output based on the output signal of said sixth circuit means; and ninth circuit means for inserting said first and second false vertical sync signals ($Q_4$, $Q_5$) in a video signal which is reproduced at a tape speed different from that used during recording.

* * * * *